(12) United States Patent
Mizuguchi et al.

(10) Patent No.: US 8,995,837 B2
(45) Date of Patent: Mar. 31, 2015

(54) SUBSCRIBER-SIDE OPTICAL COMMUNICATION DEVICE, COMMUNICATION SYSTEM, CONTROL DEVICE, AND POWER-SAVING CONTROL METHOD

(75) Inventors: Jun Mizuguchi, Tokyo (JP); Fumihiko Tano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 108 days.

(21) Appl. No.: 13/976,272

(22) PCT Filed: Jun. 29, 2011

(86) PCT No.: PCT/JP2011/064964
§ 371 (c)(1),
(2), (4) Date: Jun. 26, 2013

(87) PCT Pub. No.: WO2013/001628
PCT Pub. Date: Jan. 3, 2013

(65) Prior Publication Data
US 2013/0272708 A1    Oct. 17, 2013

(51) Int. Cl.
*H04B 10/27* (2013.01)
*H04B 10/00* (2013.01)
(Continued)

(52) U.S. Cl.
CPC .............. *H04B 10/27* (2013.01); *H04L 12/12* (2013.01); *H04L 12/2898* (2013.01);
(Continued)

(58) Field of Classification Search
CPC .......... H04B 10/27; H04J 3/0682; H04J 3/12; H04L 43/106; H04L 43/0847; H04L 43/087

USPC .................... 398/71, 70, 68, 66, 43
See application file for complete search history.

(56) References Cited

U.S. PATENT DOCUMENTS 6,222,892 B1 * 4/2001 Taki et al. ................ 375/354
8,718,482 B1 * 5/2014 Roberts et al. ........... 398/161
(Continued)

FOREIGN PATENT DOCUMENTS

EP    2615800 A1    7/2013
JP    2009 290626    12/2009
(Continued)

OTHER PUBLICATIONS

Technical Fundamentals Lecture (GE-PON Technology) No. 1, "What is PON?" NTT Technical Journal, vol. 8, pp. 71-74, (2005).
(Continued)

*Primary Examiner* — Oommen Jacob
(74) *Attorney, Agent, or Firm* — Oblon, McClelland, Maier & Neustadt, L.L.P.

(57) ABSTRACT

An ONU includes a CDR that regenerates a clock based on a signal from an OLT, an oscillator that generates an internal clock, a time stamp counter that manages a time of the ONU based on the clock in a period in which the CDR regenerates the clock and manages the time of the ONU based on the internal clock in a period in which the CDR does not regenerate the clock, an MPCP control unit that decides, when a Cyclic Sleep mode is set, a receiver-time synchronization time that is a period in which the receiver is normally operated within a sleep time, based on a difference between a time stamp value included in the signal transmitted from the OLT and a time stamp managed by the time stamp counter, and a power-saving control unit that controls the receiver to be normally operated in the receiver-time synchronization time.

11 Claims, 15 Drawing Sheets

(51) Int. Cl.
  *H04L 12/26* (2006.01)
  *H04L 12/12* (2006.01)
  *H04L 12/28* (2006.01)
  *H04J 3/06* (2006.01)
  *H04Q 11/00* (2006.01)
  *H04B 10/25* (2013.01)

(52) U.S. Cl.
  CPC ......... *H04J 3/0694* (2013.01); *H04Q 11/0067* (2013.01); *H04Q 2011/0079* (2013.01); *H04J 3/0655* (2013.01); *H04B 10/25* (2013.01); *Y02B 60/34* (2013.01); *Y02B 60/32* (2013.01)
  USPC .................. 398/71; 398/70; 398/66; 398/67; 398/43; 370/232; 370/311

(56) References Cited

U.S. PATENT DOCUMENTS

| | | | |
|---|---|---|---|
| 2006/0053309 A1* | 3/2006 | Vereen et al. | 713/300 |
| 2007/0280108 A1* | 12/2007 | Sakurai | 370/232 |
| 2008/0225898 A1* | 9/2008 | DeLew et al. | 370/503 |
| 2009/0263127 A1 | 10/2009 | Haran et al. | |
| 2009/0297164 A1* | 12/2009 | Horiuchi | 398/154 |
| 2010/0040369 A1* | 2/2010 | Zhao et al. | 398/58 |
| 2010/0118753 A1* | 5/2010 | Mandin et al. | 370/311 |
| 2011/0129218 A1* | 6/2011 | Kim | 398/45 |
| 2012/0008937 A1* | 1/2012 | Cheng et al. | 398/1 |
| 2012/0051748 A1 | 3/2012 | Hotta et al. | |
| 2012/0148246 A1* | 6/2012 | Mukai et al. | 398/58 |
| 2013/0272708 A1* | 10/2013 | Mizuguchi et al. | 398/71 |

FOREIGN PATENT DOCUMENTS

| | | |
|---|---|---|
| JP | 2010 114830 | 5/2010 |
| JP | 2010 213259 | 9/2010 |
| JP | 2011 009984 | 1/2011 |
| JP | 2011 40870 | 2/2011 |
| WO | 2011 007423 | 1/2011 |

OTHER PUBLICATIONS

Kani, J. et al., "Standardization Trend of Next Generation 10G-class PON System", NTT Technical Journal, vol. 9 p. 90-93, (2009).

Hadama, H., "Trend of Optical Access System Aiming for Further Development of Broadband Services", NTT Technical Journal, vol. 2, pp. 53-56, (2010).

Bloch, M. et al., "Emerging Applications Requiring Precision Time and Frequency" Frequency Control Symposium, Joint with the 22$^{nd}$ European F requecny and Time forum. IEEE International, pp. 364-371, (2009).

International Search Report Issued Sep. 27, 2011 in PCT/JP11/064964 Filed Jun. 29, 2011.

Search Report issued Jan. 22, 2015 in European Patent Application No. 11868485.1 (in English).

Ying Yan, et al., "Energy Management Mechanism for Ethernet Passive Optical Networks (EPONs)", 2010, IEEE, pp. 1-5.

Shing-Wa Wong, et al., "Sleep Mode for Energy Saving PONs: Advantages and Drawbacks", 2009, IEEE, pp. 1-6.

Shing-Wa Wong, et al., "Demonstration of Energy Conserving TDM-PON with Sleep Mode ONU using Fast Clock Recovery Circuit", 2010, IEEE, pp. 1-3.

"GPON power conservation; Series G Supplement 45", May 2009, ITU-T G- series Recommendations, pp. 1-43.

* cited by examiner

| | Octets |
|---|---|
| Destination Address | 6 |
| Source Address | 6 |
| Length/Type=0x8808 | 2 |
| Opcode | 2 |
| 501 — Timestamp | 4 |
| Data/Reserved/Pad | 40 |
| FCS | 4 |

FIG.14

| Value(hex) | Specification | SYNCHRONIZATION STATE |
|---|---|---|
| 00-1F | Reserved | DISABLE TIME SYNCHRONIZATION |
| 20 | The time is accurate to within 25ns | HIGH-ACCURACY TIME SYNCHRONIZATION ENABLED AREA (100ns OR SHORTER) |
| 21 | The time is accurate to within 100ns | |
| 22 | The time is accurate to within 250ns | MID-ACCURACY TIME SYNCHRONIZATION ENABLED AREA (1$\mu$s OR SHORTER) |
| 23 | The time is accurate to within 1$\mu$s | |
| 24 | The time is accurate to within 2.5$\mu$s | LOW-ACCURACY TIME SYNCHRONIZATION ENABLED AREA (1$\mu$s OR LONGER) |
| 25 | The time is accurate to within 10$\mu$s | |
| 26 | The time is accurate to within 25$\mu$s | |
| 27 | The time is accurate to within 100$\mu$s | |
| 28 | The time is accurate to within 250$\mu$s | |
| 29 | The time is accurate to within 1ms | |
| 2A | The time is accurate to within 2.5ms | |
| 2B | The time is accurate to within 10ms | |
| 2C | The time is accurate to within 25ms | |
| 2D | The time is accurate to within 100ms | |
| 2E | The time is accurate to within 250ms | |
| 2F | The time is accurate to within 1s | |
| 30 | The time is accurate to within 10s | |
| 31 | The time is accurate to > 10s | |
| 32-7F | Reserved | DISABLE TIME SYNCHRONIZATION |
| 80-FD | For use by alternate PTP profiles | MOUNT DEPENDENT |
| FE | Unknown | DISABLE TIME SYNCHRONIZATION |
| FF | Reserved | |

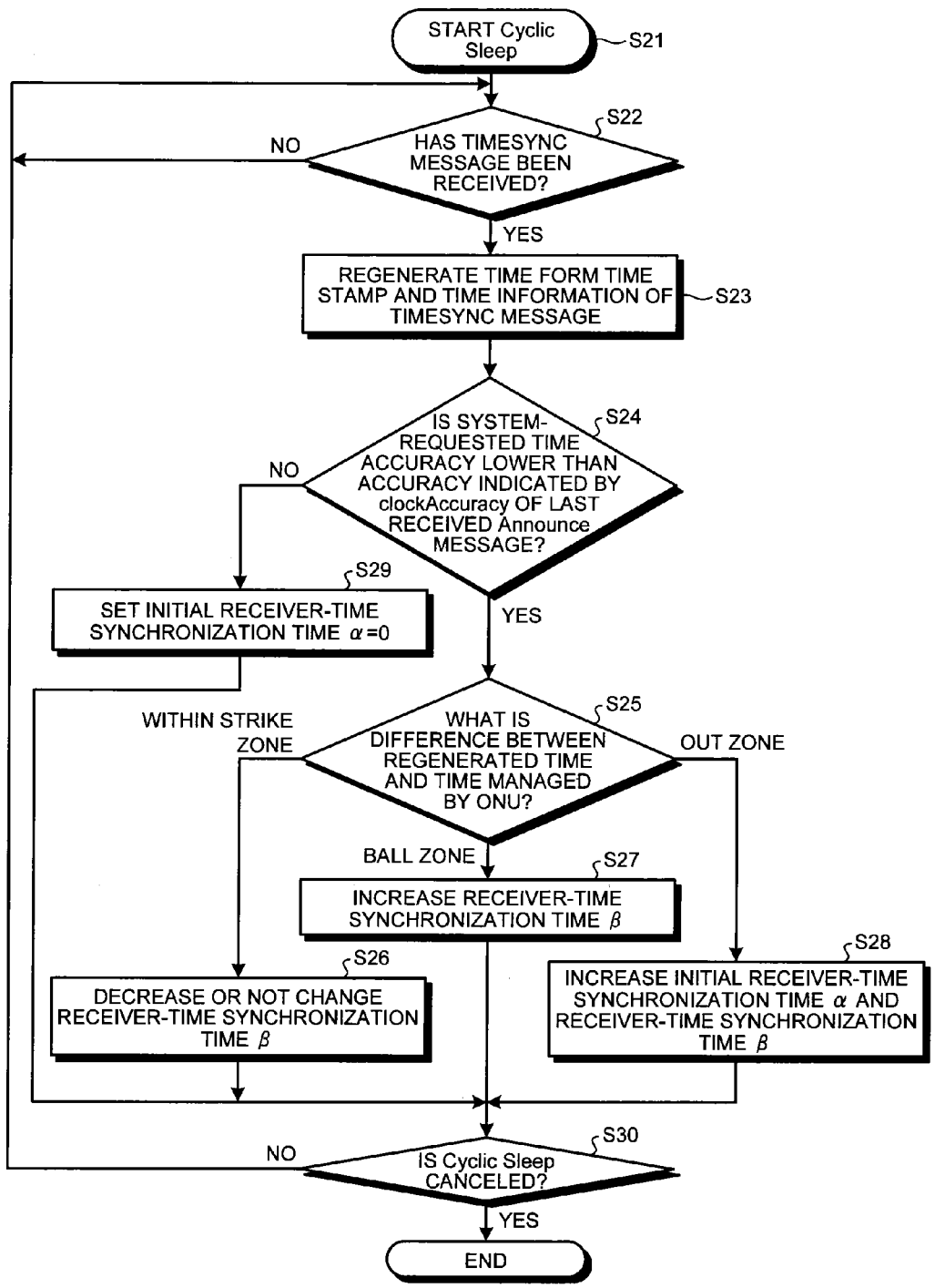

SUBSCRIBER-SIDE OPTICAL COMMUNICATION DEVICE, COMMUNICATION SYSTEM, CONTROL DEVICE, AND POWER-SAVING CONTROL METHOD

FIELD

The present invention relates to a subscriber-side optical communication device, a communication system, a control device, and a power-saving control method.

BACKGROUND

In recent years, delivery of a wide variety of services (data, audio, broadcast, and wireless data) has been expanded by using an access network between an OLT (Optical Line Terminal) and an ONU (Optical Network Unit). With the expansion of such an information service, a PON (Passive Optical Network) system based on a P2MP (Point-to-Multi Point) connection that achieves inexpensive and stable broad-bandwidth even at a location distant from a station facility has been widely used, instead of an xDSL (Digital Subscriber Line) that is a transmission system using a metal line.

In a commercial access network using the PON system, a GE (Gigabit Ethernet®)-PON is currently providing a service, which employs a WDM (Wavelength Division Multiplexing) that enables a bidirectional communication with a single optical-fiber transmission line and applies a TDM (Time Division Multiplexing) to a downstream transmission (OLT (Optical Line Terminal) →ONU (Optical Network Unit)) and a TDMA (Time Division Multiple Access) to an upstream transmission (ONU→OLT) (see, for example, Non Patent Literature 1). In addition, by applying a high-speed TDM technique, a 10G-EPON having a bit rate 10 times higher than the GE-PON has been developed (see, for example, Non Patent Literature 2).

Furthermore, not only an effort to achieve a high-speed commercial access network but also an effort to achieve a low power consumption with respect to the OLT and the ONU has been continued in order to reduce increase of the power consumption and environmental load associated with a high speed and high functionality of the communication device. To this end, a standardization of a power-saving mode in which an effect of reducing the power consumption can be obtained by intermittently controlling a conduction time of each module and unit during a time for which there is no exchange of data between the ONU and the OLT (sleep time control) has been studied by standardization organizations (the ITU-T (International Telecommunication Union Telecommunication Standardization Sector), the IEEE (Institute of Electrical and Electronic Engineers), and the like) (see, for example, Non Patent Literature 3).

Further, in the future, the PON system is highly expected as means for building an inexpensive mobile backhaul to be connected to a mobile base station (BTS: Base Terminal Station) from increase of a traffic by a mobile terminal that is rendered smart, that is, highly functional. This has also brought a discussion on clock synchronization and time synchronization function in the PON system to the standardization organizations.

CITATION LIST

Non Patent Literatures

Non Patent Literature 1: "Technical Fundamentals Lecture [GE-PON Technology], No. 1, "What is PON?", NTT Technical Journal, 2005.8, Page. 71-74

Non Patent Literature 2: Junichi KANI and Kenichi SUZUKI, "Standardization Trend of Next Generation 10G-class PON System", NTT Technical Journal, 2009.9, Page. 90-93

Non Patent Literature 3: Hisaya HADAMA, "Trend of Optical Access System Aiming for Further Development of Broadband Services", NTT Technical Journal, 2010.2, Page. 53-56

SUMMARY

Technical Problem

Because the OLT and the ONU employ the TDMA system in the upstream transmission, a system for synchronizing time stamps by an MPCP (Multi-Point Control Protocol) frame defined by the IEEE802.3ah (GE-PON) and the IEEE802.3av (10G-EPON) between the OLT and each ONU is employed. However, because the OLT and the ONU use different oscillators as respective built-in clock sources, a deviation is generated in clocks, and as a result, synchronization of the time stamps cannot be obtained. For this reason, each ONU regenerates the clock by an ONU CDR (Clock Data Recovery) of a downstream optical signal from the OLT via an optical reception module, and the ONU uses the regenerated clock as an operation clock source, thus achieving the synchronization of the clock between the OLT and the ONU.

However, in a PON system that performs a power control of the optical reception module by a power-saving mode (for example, a Doze mode for intermittently stopping only a conduction of a optical transmission module of the ONU and a Cyclic Sleep mode for intermittently stopping a conduction of an optical transmission and reception module of the ONU), when the Cyclic Sleep mode is used, the clock extraction cannot be performed during a sleep time because the power of the optical reception module is OFF, so that the clock source is switched to the built-in clock source of the ONU. Therefore, as described above, because there is a deviation in the clocks generated by the built-in clock sources between the OLT and the ONU, the deviation is increased between the OLT and the ONU during the period for which the power of the optical reception module is OFF, causing a problem that an error is generated in the time stamps that should match each other between the OLT and the ONU if the power OFF period lasts long.

As a result, when an MPCP message is received after recovering from the Cyclic Sleep mode, such a problem occurs that a time stamp drift (±8 TQ in the ONU, 1 TQ=16 ns) is detected and a PON link is disconnected. In addition, not only the clock is shifted due to an initial deviation of the clock between the OLT and the ONU, but also the clock is affected by a change of an ambient temperature of an oscillator, and thus, generally, an allowable sleep time cannot be fixedly decided. However, because a method of deciding the sleep time, which is currently studied on the standardization, adopts a system of notifying parameters that depend on experience from the OLT to the ONU, it cannot support flexibly ambient environment and an individual difference of the ONU.

Furthermore, even in a PON system that does not perform the synchronization of the time stamps by the MPCP message as described above, a high accuracy may be requested in time with respect to the ONU due to an expansion of the usage of the PON system. In general, the OLT achieves a high accuracy in time by, for example, connecting a GPS (Global Positioning System) receiver or the like, and thus, while the ONU performs the clock regeneration by the ONU CDR, the ONU can also achieve a high accuracy in time. However, even in this case, there has been a problem that, when the mode is switched to the Cyclic Sleep mode as described above, the ONU performs its operation by a clock generated by the built-in clock source, possibly resulting in a defect relative to the time accuracy of the ONU to meet a requested value.

As described above, when various time accuracy requests are set with respect to the ONU, in order to meet the time accuracy requests, for example, shortening the sleep time can be considered; however, a method of controlling the sleep time according to the time accuracy requests is not disclosed in Non Patent Literatures 1 to 3 mentioned above.

The present invention has been achieved in view of the above problems, and an object of the present invention is to provide a subscriber-side optical communication device, a communication system, a control device, and a power-saving control method that can effectively reduce power consumption according to a time accuracy request while meeting a set time accuracy request.

Solution to Problem

In order to solve the above problem and in order to attain the above object, in a subscriber-side optical communication device that includes an optical transmission-and-reception module for performing transmission and reception of a signal with a station-side optical communication device and is configured to cause a receiver and a transmitter constituting the optical transmission-and-reception module to enter into a power-saving state separately, the subscriber-side optical communication device of the present invention includes: a clock regeneration unit that regenerates a clock based on a signal from the station-side optical communication device received by the optical transmission-and-reception module and supplies the clock; an internal clock source that generates an internal clock and supplies the internal clock; a time management unit that manages a time of the subscriber-side optical communication device based on the clock in a period in which the CDR supplies the clock and manages the time of the subscriber-side optical communication device based on the internal clock in a period in which the CDR does not supply the clock; a sleep-time control unit that decides, when a power-saving mode for causing the receiver to enter into a power-saving state for a predetermined sleep time is set, a receiver-time synchronization time that is a period in which the receiver is normally operated within the sleep time, based on a difference between predetermined information indicating a time in the station-side optical communication device included in the signal transmitted from the station-side optical communication device and the time managed by the time management unit; and a power-saving control unit that controls the receiver to be normally operated in the receiver-time synchronization time during the sleep time.

Advantageous Effects of Invention

The subscriber-side optical communication device, the communication system, the control device, and the power-saving control method according to the present invention can effectively reduce power consumption according to a time accuracy request while meeting a set time accuracy request.

BRIEF DESCRIPTION OF DRAWINGS

FIG. 14 depicts values and meanings of a clockAccuracy stored in the Announce message.

FIG. 16 is an example of a procedure for deciding $\beta$ according to the second embodiment.

DESCRIPTION OF EMBODIMENTS

Exemplary embodiments of a subscriber-side optical communication device, a communication system, a control device, and a power-saving control method according to the present invention will be explained below in detail with reference to the accompanying drawings. The present invention is not limited to the embodiments. In the following embodiments, while an EPON is explained as an example, a GPON can be also employed. That is, the present invention can be applied to a system employing a PON mechanism. In addition, as long as a communication system performs power-saving control and time synchronization, the present invention can be applied to any communication system other than a PON system.

First Embodiment

Figure 1:
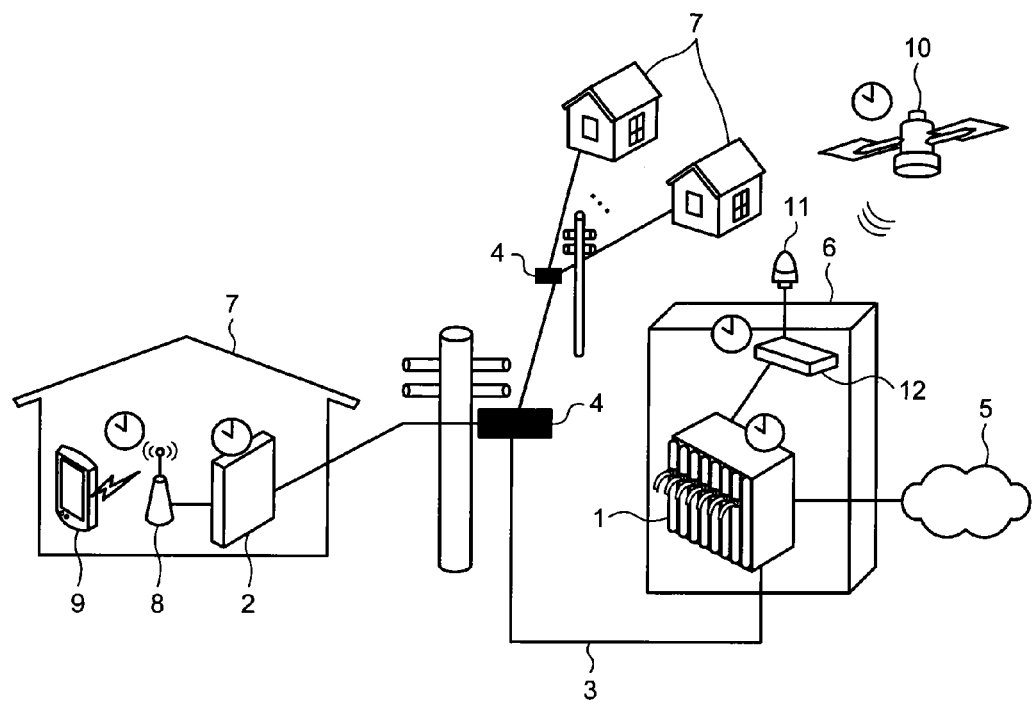
FIG. 1 is a configuration example of a communication system according to a first embodiment.

FIG. 1 is a configuration example of a communication system according to a first embodiment of the present invention. The communication system according to the present embodiment includes an OLT (station-side optical communication device) 1 and at least one ONU (subscriber-side optical communication device) 2. The OLT 1 is connected to an optical fiber 3, and is eventually connected to the ONU 2 via the optical fiber 3 and a closure 4. The OLT 1 is installed in, for example, a station facility 6, and is further connected to a core network 5. Furthermore, the OLT 1 is connected to a GPS receiver 12, and acquires a highly-accurate reference time received from a GPS satellite 10 via a GPS antenna 11 and the GPS receiver 12. Although an example of using the GPS receiver 12 as a reference time source of the OLT 1 is shown in FIG. 1, the reference time source is not limited thereto, but the reference time may be acquired from, for example, a time server or the like connected via the core network 5.

The ONU 2 is installed in a subscriber's house 7, and is connected to a base terminal station 8 through a home network (an indoor line). The base terminal station 8 performs a wireless communication with a mobile terminal 9. Although the ONU 2 in only one subscriber's house 7 is shown in FIG. 1, the ONU 2 is also installed in other subscribers' houses 7.

In the present embodiment, a PON system having a P2MP (Point to Multipoint) configuration is explained with the following example; however, the application range of the present invention is not limited to a PON system having the P2MP configuration. Furthermore, other techniques such as the WDM can be used together, and the transmission speed is not limited to 1G/10G. In addition, the installation locations of the ONU 2 and the OLT 1 are not limited to the example shown in FIG. 1, and an MDU (Multi Dwelling UNIT) can also be used instead of the ONU.

The OLT 1 according to the present embodiment transmits data received from the core network 5 to the ONU 2 via the optical fiber 3 and the closure 4, and transmits data received from the ONU 2 to the core network 5.

Figure 2:
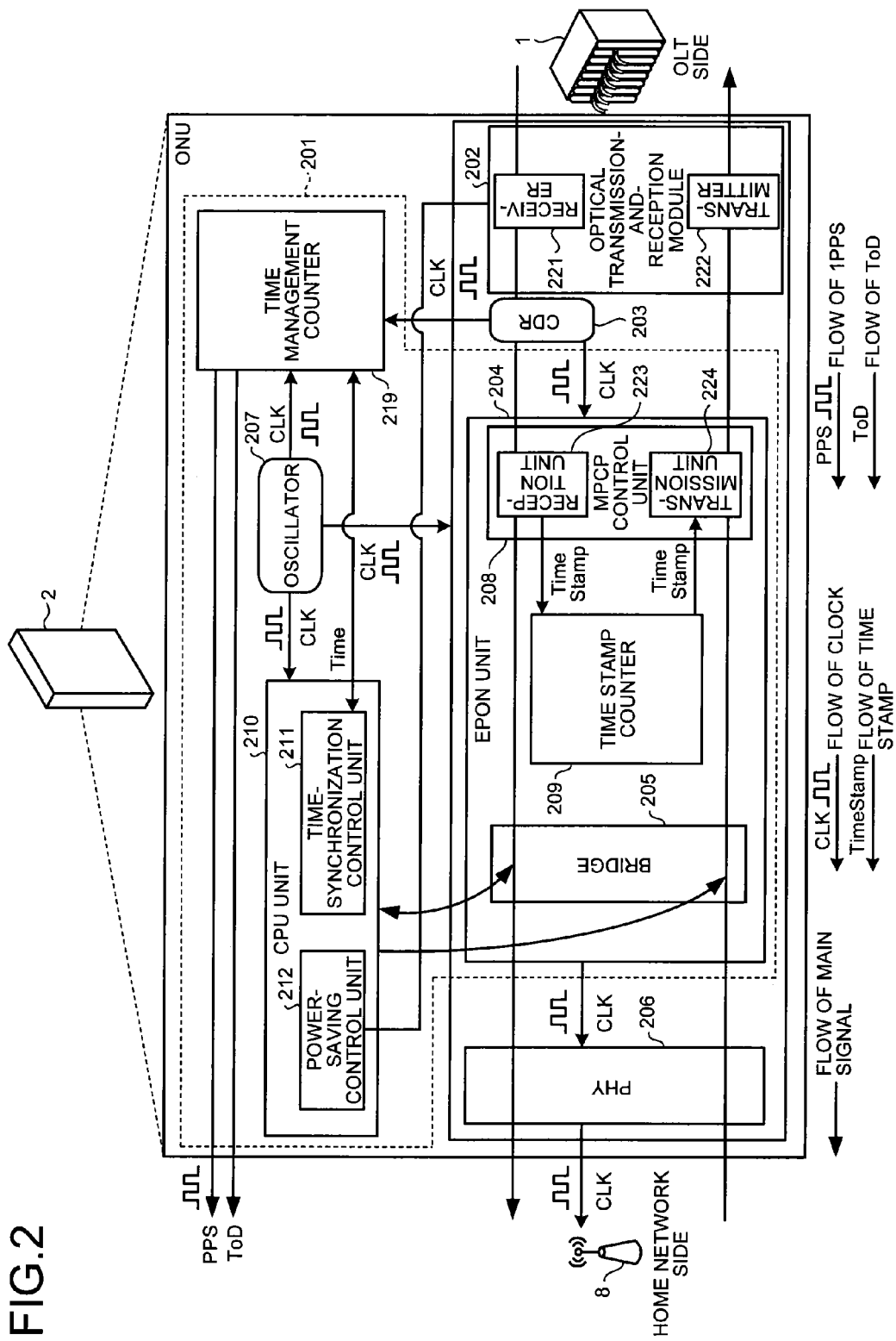
FIG. 2 is a functional configuration example of an ONU according to the first embodiment.

FIG. 2 is a functional configuration example of the ONU 2 according to the present embodiment. The ONU 2 according to the present embodiment includes an optical transmission-and-reception module 202, a CDR (clock regeneration unit) 203, an EPON unit 204, a PHY 206, a CPU (Central Processing Unit) unit 210, an oscillator (internal clock source) 207, and a time management counter (time management unit) 219. The optical transmission-and-reception module 202 includes a receiver 221 and a transmitter 222. The EPON unit 204 includes a bridge 205, an MPCP control unit 208, and a time stamp counter (time management unit) 209. Furthermore, the MPCP control unit 208 includes a reception unit 223 and a transmission unit 224. The CPU unit 210 includes a power-saving control unit 212 and a time-synchronization control unit 211. The EPON unit 204, the CPU (Central Processing Unit) unit 210, the oscillator 207, and the time management counter 219 constitute a control device 201.

When a time synchronizing process using a TIMESYNC message defined by the IEEE802.1AS is not performed, the present embodiment does not have to include the time-synchronization control unit 211 and the time management counter 219.

In the ONU 2 according to the present embodiment, the optical fiber 3 on a side of the OLT 1 is connected to the optical transmission-and-reception module 202. The indoor line on a side of the home network is connected to the PHY 206. In the ONU 2, a downstream optical signal from the OLT 1 to the ONU 2 is received by the receiver 221 of the optical transmission-and-reception module 202. The receiver 221 converts the received downstream optical signal into an electrical signal and inputs the electrical signal to the CDR 203. The CDR 203 extracts a clock and downstream data transmitted from the OLT 1 from the input electrical signal, and supplies the extracted downstream data to the EPON unit 204 and the time management counter 219.

The EPON unit 204 is operated based on the supplied clock. The reception unit 223 of the EPON unit 204 determines whether the downstream data is an MPCP message (Discovery Gate message, Normal Gate message, or the like) sent from the OLT 1. When the downstream data is an MPCP message, the reception unit 223 extracts a time stamp value of 32-bit width from the MPCP message and notifies the time stamp value to the time stamp counter 209.

The time stamp counter 209 increments by +1 count for every 16 nanoseconds (1 TQ) based on the clock supplied from the CDR 203 using the time stamp extracted from the MPCP message as a counter value.

Upon detecting that a difference between the time stamp value extracted from the MPCP message and a value managed by the time stamp counter 209 is ±8 TQ or more, the MPCP control unit 208 performs a PON link disconnecting process referred to as "Deregister". The oscillator 207 supplies a clock to each block of the ONU 2 until the CDR 203 extracts the clock. Furthermore, the reception unit 223 of the MPCP control unit 208 inputs the downstream data to the bridge 205.

The bridge 205 performs a search for a table that stores therein information for identifying frames for the power-saving control and the time synchronization and the like, based on a MAC (Media Access Control) address, a VLAN (Virtual Local Area Network) identifier, and the like of the input downstream data (a frame), and transfers a frame that is determined to be hit to the CPU unit 210. A frame that is determined to be mishit is transferred to the PHY 206 and output to a side of the home network.

The CPU unit 210 checks the inside of the frame received from the bridge 205 in detail, and distributes the frame to the time-synchronization control unit 211 if it is a frame used for the time synchronization (for example, a TIMESYNC message or an Announce message) and to the power-saving control unit 212 if it is a frame related to the power-saving control. The CPU unit 210 generates a frame addressed to the OLT 1 related to the power-saving control or the like, and transmits the generated frame to the bridge 205. The bridge 205 inputs the frame received from the CPU unit 210 to the transmission unit 224 of the MPCP control unit 208. When the received frame is an MPCP message, the transmission unit 224 stores therein the counter value of the time stamp counter 209 as the time stamp value of the frame, and inputs the counter value to the transmitter 222. The transmitter 222 converts the input data into an optical signal, and transmits the optical signal to the OLT 1 via the optical fiber 3. A physical transmission rate between the OLT 1 and the ONU 2 and a physical transmission rate of the PHY 206 depend on the mounting, and are not particularly limited to any form.

Furthermore, upstream data received from a side of the home network is input to the bridge 205 by the PHY 206. The bridge 205 inputs the upstream data to the transmission unit 224 of the MPCP control unit 208. The transmission unit 224 inputs the received upstream data to the transmitter 222. The transmitter 222 converts the input upstream data into an optical signal and transmits the optical signal to the OLT 1 via the optical fiber 3.

Figure 3:
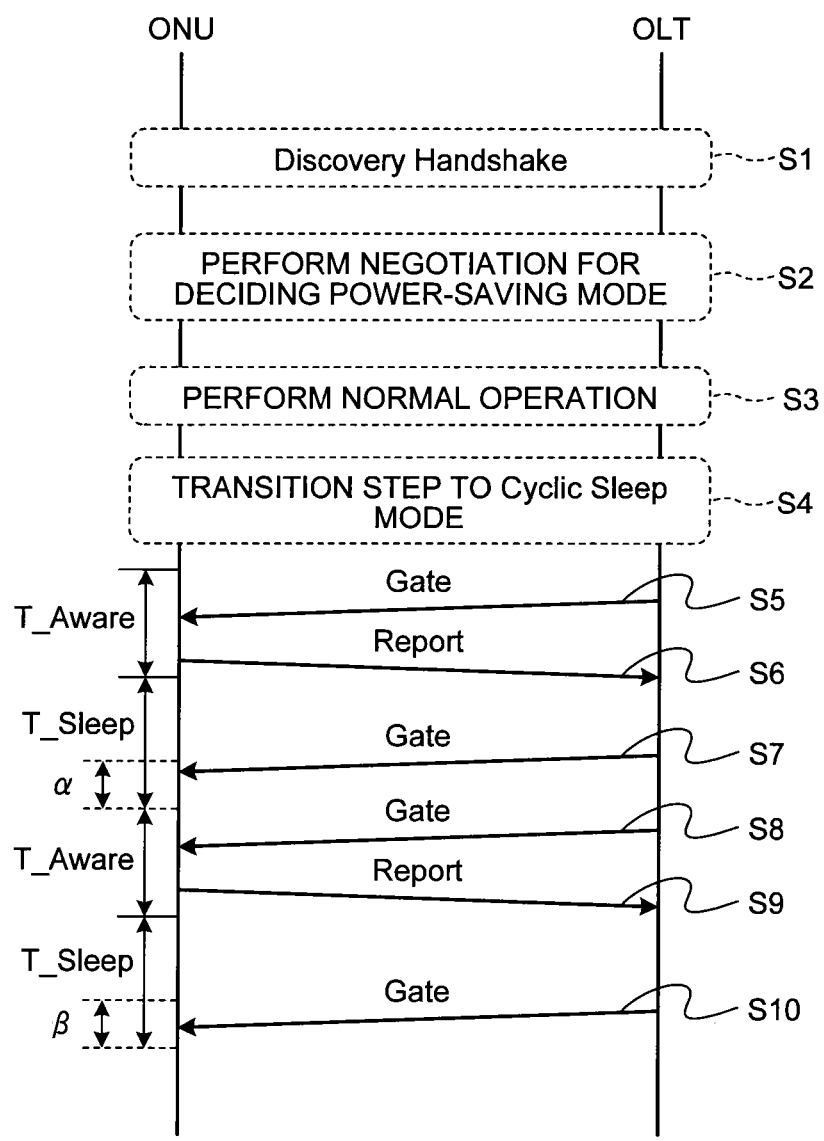
FIG. 3 is a chart of a Discovery Handshake and message exchanges thereafter in the first embodiment.

Operations of the present embodiment are explained below. FIG. 3 is a chart of a Discovery Handshake and message exchanges thereafter performed between the OLT 1 and the ONU 2 according to the present embodiment. While explanations are by using terminologies defined by the ITU-T, a protocol for controlling the power saving and a protocol for controlling the time synchronization are not limited those defined by the ITU-T. For example, a protocol for controlling the power saving defined by the IEEE can also be also used.

In the power-saving control, a power-saving mode (for example, a Doze mode and a Cyclic Sleep mode defined by the ITU-T) and a sleep time are decided following a protocol defined by the ITU-T, the IEEE, or the like and state transition, and power of the optical transmission-and-reception module 202 is controlled, by which power consumed by the ONU 2 is reduced. In the sleep time, the receiver 221 and the transmitter 222 enter into a power-saving state (a sleep state) in which a power supply is stopped or the like.

The Doze mode is a mode that stops only the transmitter 222 without stopping the receiver 221 of the optical transmission-and-reception module 202. On the other hand, the Cyclic Sleep mode is a sleep that stops both the receiver 221 and the transmitter 222 of the optical transmission-and-reception module 202 in a cyclic manner. As the sleep time is increased, the Cyclic Sleep mode that stops the functions of the both directions of the optical transmission-and-reception module 202 is more effective in reducing the power consumption than the Doze mode.

As shown in FIG. 3, upon being activated, the OLT 1 and the ONU 2 perform "Discovery Handshake" for establishing a link (Step S1). Subsequently, the OLT 1 and the ONU 2 perform a negotiation for deciding the power-saving mode to be set to the ONU 2 (Step S2). Specifically, for example, the ONU 2 notifies a supportable power-saving mode to the OLT 1, and the OLT 1 decides the power-saving mode to be set to the ONU 2 based on the notification, and notifies the decided power-saving mode to the ONU 2.

A normal operation is performed until a trigger for operating in the power-saving mode is generated (Step S3). When the trigger for making transition to the power-saving mode is generated in the OLT 1 or the ONU 2, both the OLT 1 and the ONU 2 make transition to the power-saving mode that is decided at the negotiation by a predetermined process (Step S4). In this case, it is assumed that the OLT 1 and the ONU 2 makes transition to the Cyclic Sleep mode.

When a period for which the ONU 2 performs a normal operation is set to T_Aware and a sleep period of the ONU 2 is set to T_Sleep, the T_Aware and the T_Sleep are alternately repeated in the Cyclic Sleep mode. In the ONU 2, when a gate (Gate) message that is an MPCP message is received in the T_Aware before entering into the first T_Sleep (Step S5), the MPCP control unit 208 adjusts the internal clock of the ONU 2 by extracting the time stamp from the Gate message as described above, and returns a Report message (Step S6).

The OLT 1 measures a frame round-trip time (RTT) between the OLT 1 and each ONU 2 at a regular interval following a rule of the IEEE802.3av, and uses the measured frame round-trip time to control a transmission start time and a transmission amount to be assigned to an upstream communication of each ONU 2. Therefore, the OLT 1 and the ONU 2 need to be synchronized with each other. The OLT 1 and the ONU 2 respectively manage the time stamps, and the ONU 2 adjusts the value of the time stamp counter 209 to match the time stamp value stored in the MPCP message transmitted from the OLT 1 based on the time stamp value (a time stamp of the OLT 1) stored in the MPCP message.

Figure 4:
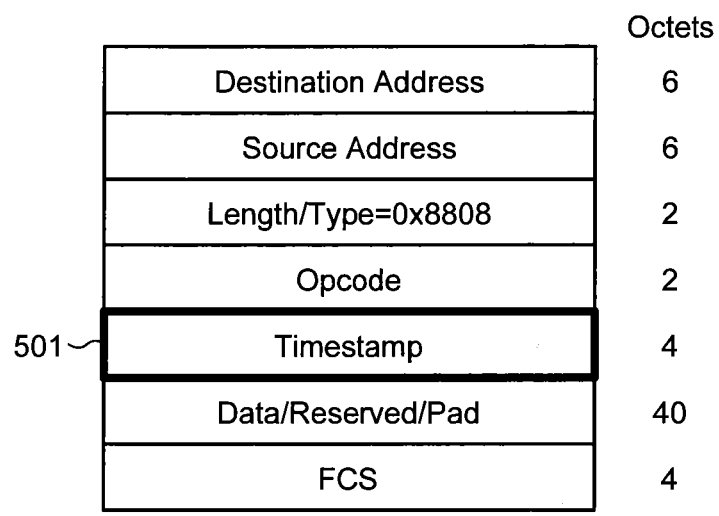
FIG. 4 depicts a format of an MPCP message.

FIG. 4 depicts a format of the MPCP message transmitted and received between the OLT 1 and the ONU 2. The format shown in FIG. 4 is a format based on the IEEE802.3av. A value stored in a Timestamp field 501 shown in FIG. 4 is the time stamp value mentioned above.

When the sleep period T_Sleep set at the time of making transition to the Cyclic Sleep mode is started, the power-saving control unit 212 of the ONU 2 stops the transmitter 222 and the receiver 221 of the optical transmission-and-reception module 202. Thereafter, at a time earlier than an end point of the T_Sleep by $\alpha$ ($\alpha$ is an initial value of a period for reducing the sleep period (hereinafter, "receiver-time synchronization time")) within the T_Sleep, the power-saving control unit 212 recovers the receiver 221 from a stopped state to an operating state. This enables the ONU 2 to process a reception of a message transmitted from the OLT 1, so that the MPCP control unit 208, upon receiving the Gate message, extracts the time stamp value and adjusts the internal clock of the ONU 2 in the same manner as a normal operation, and determines whether the period for reducing the sleep period is appropriate. When it is determined that the period for reducing the sleep period is not appropriate, the MPCP control unit 208 sets a receiver-time synchronization time (a period for reducing the sleep period) $\beta$ for the next time and later to an appropriate value (Step S7). During the period $\alpha$, the transmitter 222 is stopped, so that a Report message is not transmitted.

In the T_Aware again, the ONU 2 receives the Gate message in the same manner as Steps S5 and S6 mentioned above, extracts the time stamp value and adjusts the internal clock of the ONU 2, and returns the Report message (Steps S8 and S9). In the T_Sleep again, the power-saving control unit 212 of the ONU 2 stops the transmitter 222 and the receiver 221 of the optical transmission-and-reception module 202. Thereafter, at a time earlier than an end point of the T_Sleep by $\beta$ within the T_Sleep, the power-saving control unit 212 recovers the receiver 221 from a stopped state to an operating state. In the same manner as Step S7, the MPCP control unit 208 receives the Gate message, extracts the time stamp value and adjusts the internal clock of the ONU 2, determines whether $\beta$ is appropriate, and when it is determined that $\beta$ is not appropriate, sets $\beta$ for the next time and later to an appropriate value (Step S10).

Steps S8 to S10 are repeated until the Cyclic Sleep mode is terminated. In the present embodiment, as described above, a time error (a time error with the OLT 1) in the ONU 2 due to a deviation of the internal clock between the OLT 1 and the ONU 2 is reduced by reducing the T_Sleep period by $\alpha$ or $\beta$ only for the receiver 221. Hereinafter, the Cyclic Sleep mode in which the T_Sleep period is reduced only for the receiver 221 in this manner is referred to as "Cyclic Sleep mode (ASYNC)", and the normal Cyclic Sleep mode (the receiver 221 and the transmitter 222 are stopped for the same period (T_Sleep)) is referred to as "Cyclic Sleep mode (SYNC)".

Figure 5:
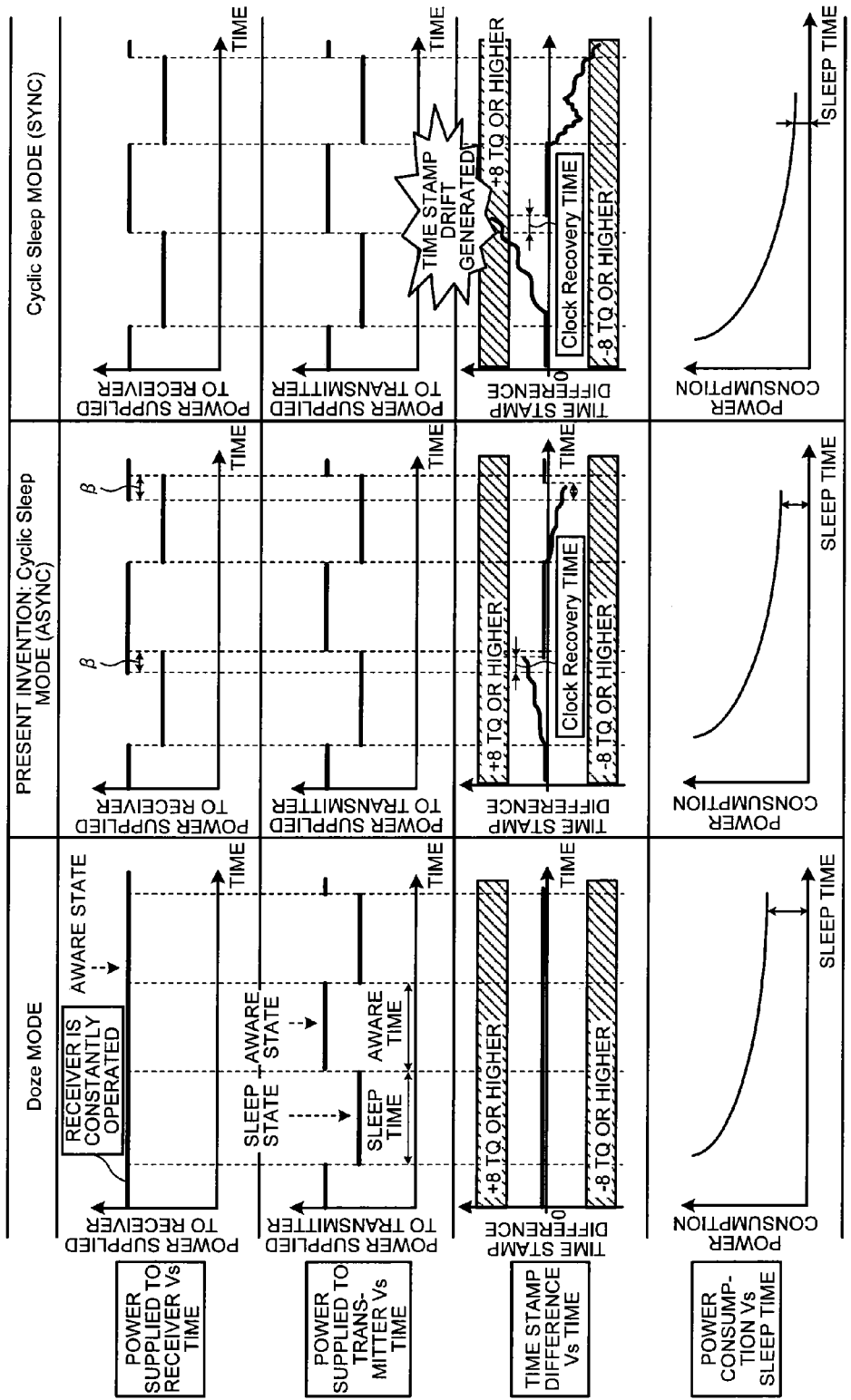
FIG. 5 depicts a comparison between a Cyclic Sleep mode (ASYNC) according to the first embodiment and a normal power-saving mode.

FIG. 5 depicts a comparison between the Cyclic Sleep mode (ASYNC) according to the present embodiment and a normal power-saving mode. In FIG. 5, "power supplied to receiver Vs time", "power supplied to transmitter Vs time", "time stamp difference Vs time", and "power consumption Vs sleep time" are shown sequentially from above, while showing the Doze mode on the left, the Cyclic Sleep mode (ASYNC) according to the present embodiment in the middle, and the Cyclic Sleep mode (SYNC) that is the normal Cyclic Sleep mode on the right. The time stamp difference indicates a difference between the time stamp managed by the time stamp counter 209 of the ONU 2 and the time stamp managed by the OLT 1. The power consumption indicates a power consumption of the ONU 2.

Figure 6:
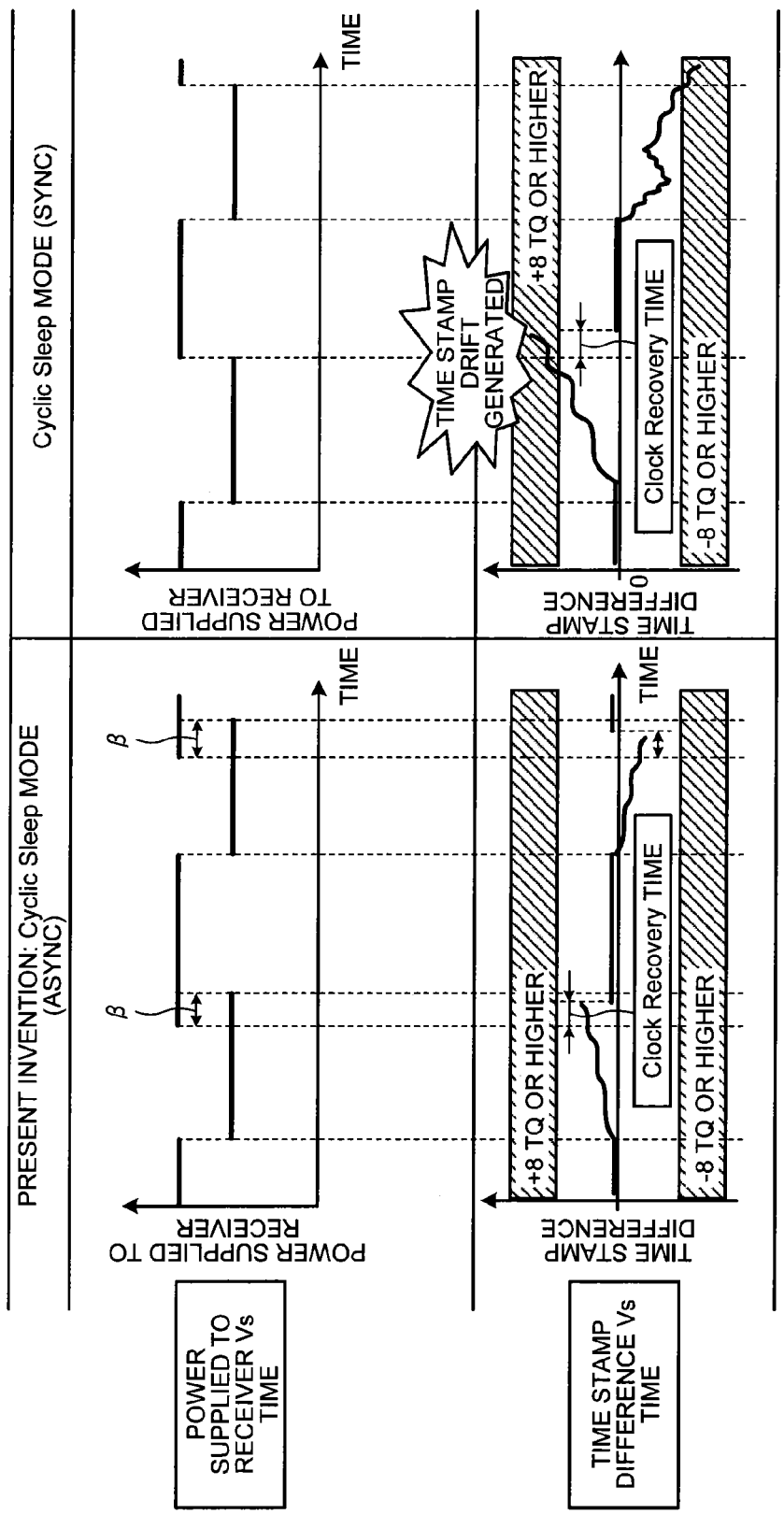
FIG. 6 is an enlarged diagram of "power supplied to receiver Vs time" and "time stamp difference Vs time".
Figure 7:
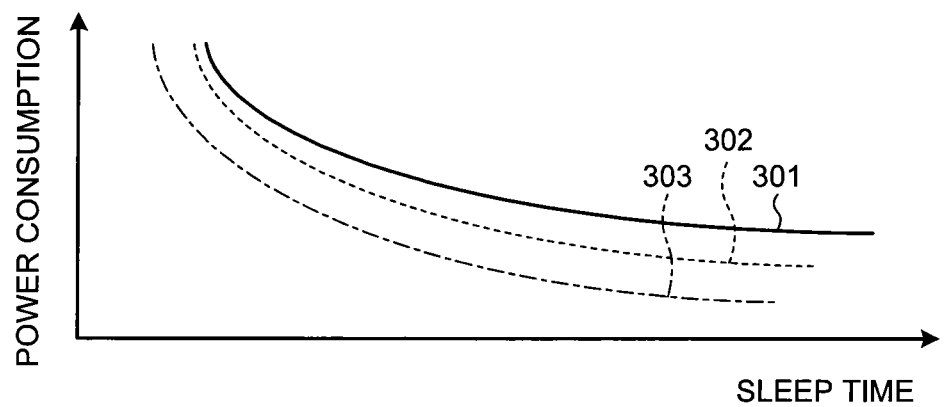
FIG. 7 depicts power consumptions of modes with respect to a sleep time.

FIG. 6 is an enlarged diagram of "power supplied to receiver Vs time" and "time stamp difference Vs time" for the Cyclic Sleep mode (ASYNC) and the Cyclic Sleep mode (SYNC) shown in FIG. 5. FIG. 7 depicts power consumptions of the three modes shown in FIG. 5 with respect to the sleep time. In FIG. 7, a curve 301 indicates the power consumption of the Doze mode, a curve 302 indicates the power consumption of the Cyclic Sleep mode (ASYNC), and a curve 303 indicates the power consumption of the Cyclic Sleep mode (SYNC).

As shown in FIGS. 5 and 7, in the Doze mode, the time stamp difference is not generated because the receiver 221 is not stopped; however, the power consumption is larger than that of the Cyclic Sleep mode (SYNC). On the contrary, in the Cyclic Sleep mode (SYNC), the power consumption is small; however, the time stamp difference is increased with an increase of the sleep time, which may cause a time stamp drift. The time stamp drift is detected when the time managed by the ONU 2 is shifted from the time managed by the OLT 1 by ±8 TQ or more. When the setting is made to perform the Deregister (that is, disconnect the PON link) when the time stamp drift is generated, if transition is made to the normal Cyclic Sleep mode (SYNC), the Deregister may be generated at the end point of the sleep period. On the other hand, although it can be considered to ignore the first determination result of the time stamp difference after returning from the Cyclic Sleep mode, because it does not make any difference in that the time stamp values are not practically synchronized between the OLT 1 and the ONU 2, there is a problem that the time synchronization cannot be obtained with the time synchronization mechanism that is based on the time stamp.

On the other hand, in the Cyclic Sleep mode (ASYNC) according to the present embodiment, as shown in FIGS. 5 and 6, the period β (or α) for stopping the transmitter 222 and operating the receiver 221 by reducing the sleep period to be shorter than the normal sleep period, and thus the time stamp difference can be reduced as compared to the Cyclic Sleep mode (SYNC).

Figure 8:
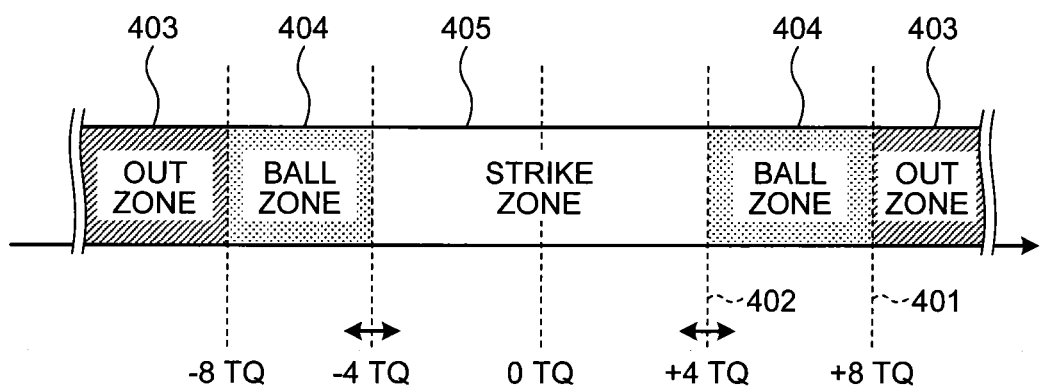
FIG. 8 is an example of a determination reference used to decide a receiver-time synchronization time $\beta$.

A method of deciding the receiver-time synchronization time β is explained below. FIG. 8 is an example of a determination reference used to decide the receiver-time synchronization time β. The horizontal axis of FIG. 8 represents the time stamp difference. A boundary line 401 indicates a boundary line (±8 TQ) used to make a determination to perform the Deregister, and an out zone 403 on an outer side of the boundary line 401 is an area where the Deregister is generated. A boundary line 402 can be set at an arbitrary position on an inner side of the boundary line 401, which is a boundary between a ball zone 404 and a strike zone 405. In this example, the boundary line 402 is set at, for example, ±4 TQ.

In the present embodiment, β is decided such that the Deregister is prevented from being generated at the end point of the sleep period, based on the time stamp difference at the time of performing the decision of β. The strike zone 405 shown in FIG. 8 indicates an area where the time stamp difference is sufficiently small so that it is considered that the Deregister is unlikely to generated at the time of terminating the sleep period, and the ball zone 404 indicates an area where the Deregister is likely to be generated at the time of terminating the sleep period.

Figure 9:
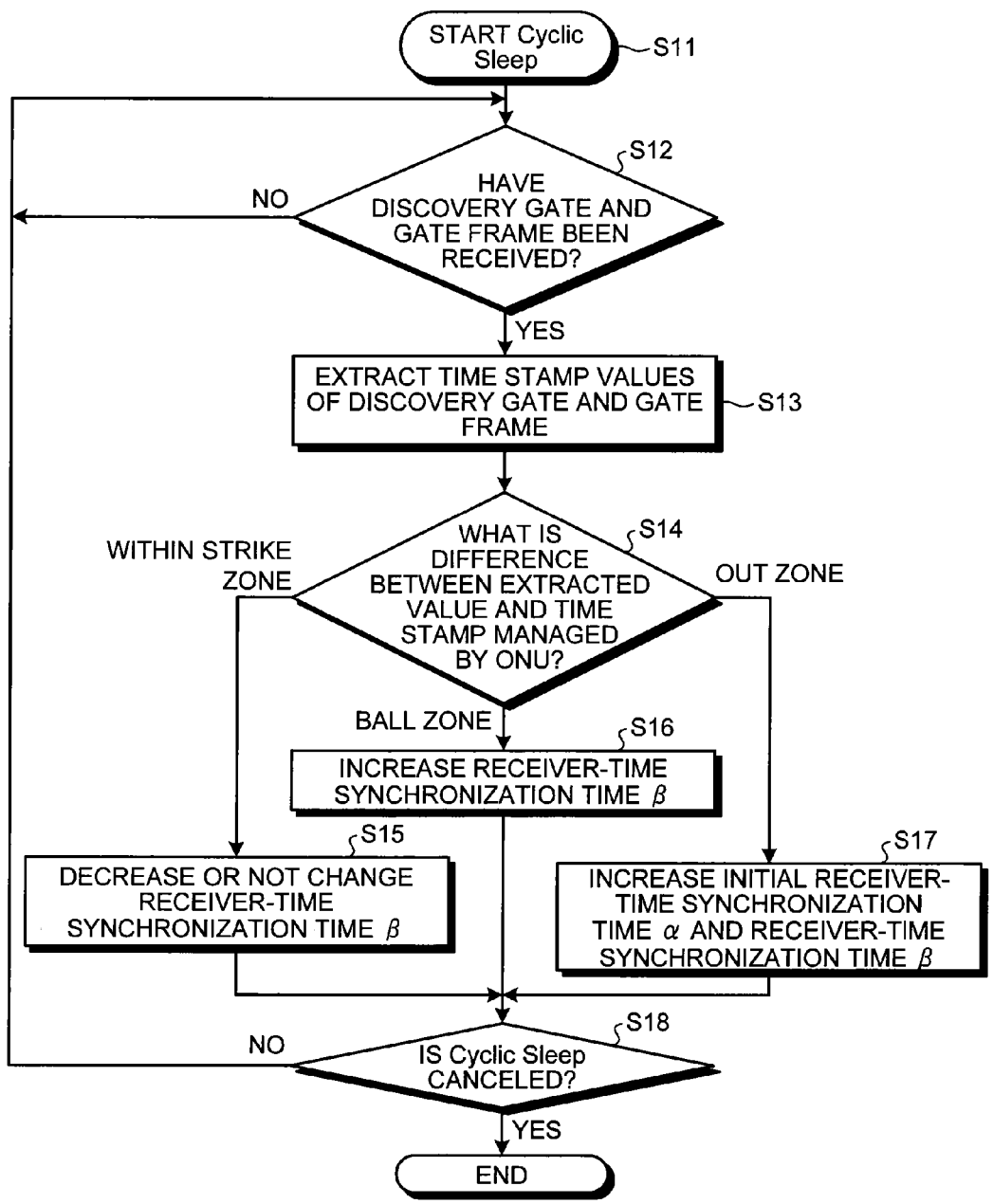
FIG. 9 is an example of a procedure for deciding the receiver-time synchronization time $\beta$.

FIG. 9 is an example of a procedure for deciding the receiver-time synchronization time 3. It is assumed that the receiver-time synchronization time β is initially set to an arbitrary value. For example, the receiver-time synchronization time β may be set to the same value as α that is the initial value of the receiver-time synchronization time. As shown in FIG. 9, In the ONU 2, when the Cyclic Sleep mode is started (Step S11), the MPCP control unit 208 determines whether a Discovery Gate (a frame of a Discovery Gate message) or a Gate frame (a frame of a Normal Gate message) is received from the OLT 1 (Step S12), and when it is determined that the Discovery Gate or the Gate frame is received (YES at Step S12), extracts the time stamp value from the received frame (Step S13).

The MPCP control unit 208 calculates a difference between the time stamp managed by the time stamp counter 209 of the ONU 2 and the time stamp value extracted from the frame, and determines whether the calculated difference falls within any one of the strike zone, the ball zone, and the out zone shown in FIG. 8 (Step S14). When it is determined that the calculated difference is within the strike zone (within the strike zone at Step S14), the MPCP control unit 208 decreases the receiver-time synchronization time β to be shorter than the initial receiver-time synchronization time α (when performing a repeated operation at Step S18 that is described later, β that is already set) or does not change the receiver-time synchronization time β (Step S15), and determines whether the Cyclic Sleep mode is canceled (Step S18). When it is determined that the Cyclic Sleep mode is canceled (YES at Step S18), the MPCP control unit 208 terminates the process. When it is determined that the Cyclic Sleep mode is not canceled (NO at Step S18), the MPCP control unit 208 returns to Step S12.

When it is determined that the calculated difference is within the ball zone Step S14 (within the ball zone at Step S14), the MPCP control unit 208 increases the receiver-time synchronization time β to be longer than the initial receiver-time synchronization time α (when performing a repeated operation at Step S18, β that is already set) (Step S16), and proceed to Step S18. When it is determined that the calculated difference is in the out zone (the out zone at Step S14), the MPCP control unit 208 increases the initial receiver-time synchronization time (an initial value of the receiver-time synchronization time) α and the receiver-time synchronization time β (Step S17), and proceeds to Step S18.

Figure 10:
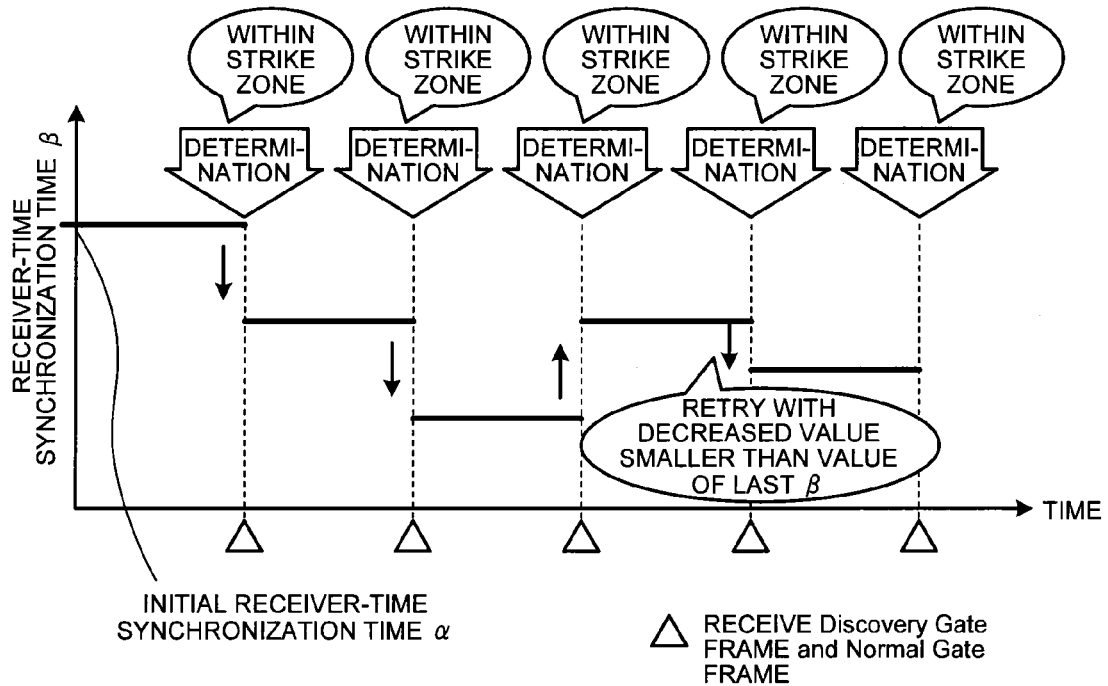
FIG. 10 is an example of a change of the receiver-time synchronization time $\beta$.

FIG. 10 is an example of a change of the receiver-time synchronization time β. First, the receiver-time synchronization time is set to the initial receiver-time synchronization time α. Thereafter, when a Discovery Gate frame or a Gate frame is received, a decision of the value of β is performed in the procedure explained with respect to FIG. 9, such that β is decreased when it is determined that the time stamp difference is within the strike zone and increased when the time stamp difference is broadened to be within the ball zone. By repeating this control, the optimum receiver-time synchronization time β is decided flexibly in response to the ambient environment and the individual difference of the ONU 2.

Figure 11:
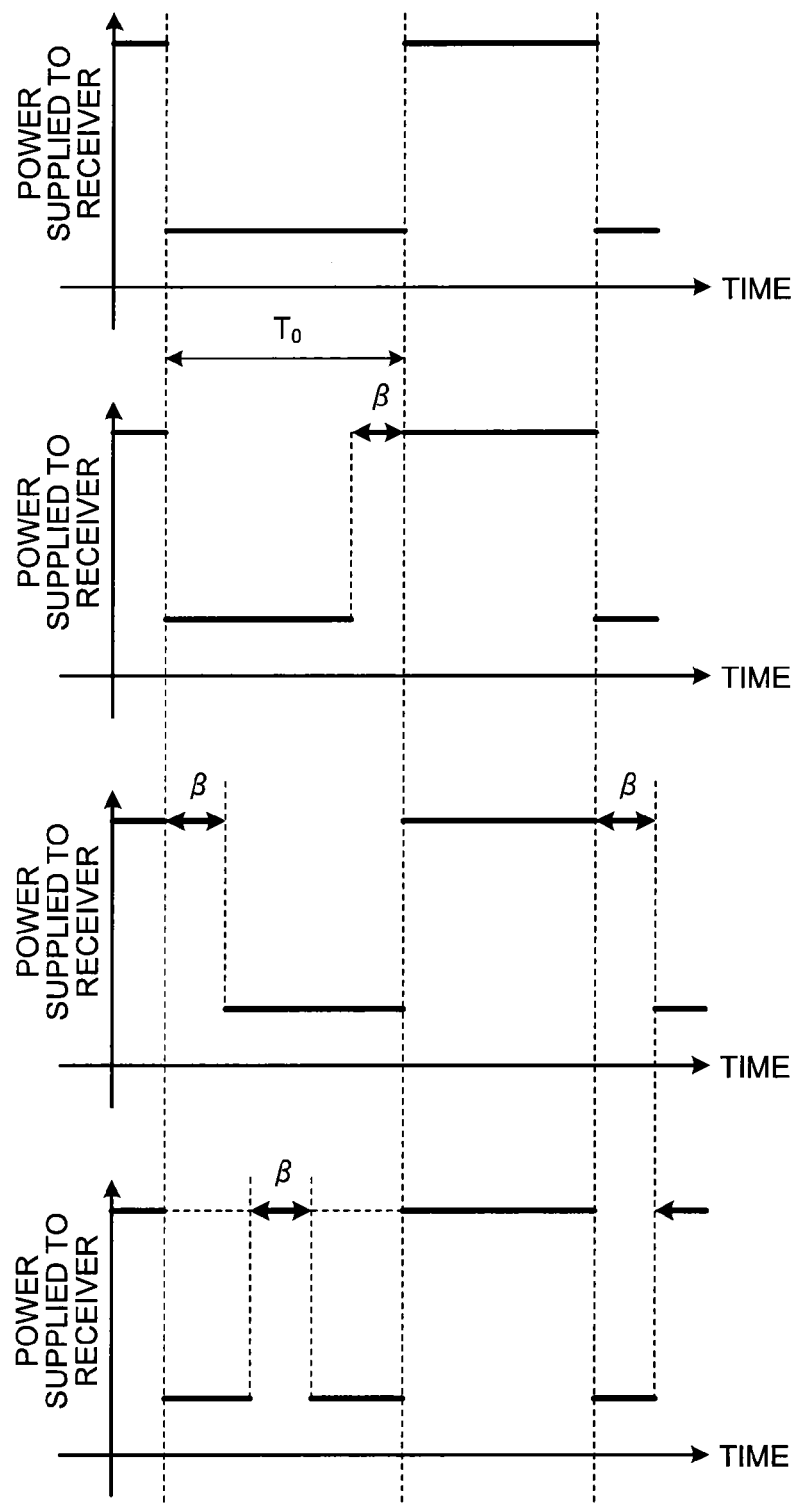
FIG. 11 is a setting example of a period $\beta$.

In the present embodiment, the period α or β is provided at the end of the sleep time; however, the present invention is not limited thereto, but the period α or β can be provided at any point in the sleep time. FIG. 11 is a setting example of the period β. The top part of FIG. 11 indicates the power supplied to the receiver in the case of the Cyclic Sleep mode (SYNC), where the sleep time is indicated as $T_0$. The second part is a setting example of the period β at the end of the sleep time as described above, the third part is an example of the setting β at the beginning of the sleep period, and the bottom part is an example of the setting β in the middle of the sleep period. The number of times of the setting β per sleep period is not necessarily to be one, but can be plural times. Because a predetermined time is generally required since the receiver 221 is supplied with a current until it is in a usable state, in order to reduce the loss of the power consumption during this predetermined time, it is preferred to provide β at the beginning or the end of the sleep period.

In the present embodiment, the MPCP control unit 208 has a function as a sleep-time control unit that performs a sleep time control for deciding the receiver-time synchronization time β and the initial value α of the receiver-time synchronization time; however, the sleep-time control unit can be provided separately from the MPCP control unit 208.

In the present embodiment, the Cyclic Sleep mode is explained as an example; however, even if the control is not performed in a cyclic manner, the same sleep time control can be performed as long as the power-saving mode sets the same sleep time to the receiver 221 and the transmitter 222. Furthermore, even in the case where the sleep time is set only in the receiver 221, the same sleep time control can be performed.

In the present embodiment, after deciding α and β, the ONU 2 reduces the sleep time of the receiver 221 based on a result of the decision; however, the ONU 2 can also notify α and β to the OLT 1, and after being instructed a reduced sleep time from the OLT 1 (or being allowed a reduced sleep time), reduce the sleep time of the receiver 221 based on the instruction.

As described above, in the present embodiment, in the ONU 2 when performing the Cyclic Sleep mode, it is configured that the sleep time of the receiver 221 is reduced to be shorter than the sleep time of the transmitter 222 by a predetermined time, and a length of the predetermined time is automatically controlled based on the time stamp difference. Therefore, the sleep time can be adjusted in a cyclic manner such that the optimum sleep time can be obtained without generating any time stamp drift. Furthermore, the optimum sleep time can be calculated in response to an environment (an individual difference, a temperature difference, and clock deviation due to a voltage difference) of the oscillator of the ONU 2, offering a feature that the maximum power-consumption reducing effect can be obtained.

Second Embodiment

A time-synchronization control method according to a second embodiment of the present invention is explained below. In the first embodiment, an example is explained in which the MPCP control unit 208 performs the sleep time control by using the time stamp of the time stamp counter 209; however, in the present embodiment, the time-synchronization control unit 211 performs the sleep time control by using the time stamp of the time management counter 219.

The configuration of a communication system according to the present embodiment is identical to that of the first embodiment. Furthermore, the configuration of an ONU 2 according to the present embodiment is identical to that of the ONU 2 according to the first embodiment. Constituent elements having functions identical to those of the first embodiment are denoted by like reference signs as those of the first embodiment and explanations thereof will be omitted. Features different from the first embodiment are explained below.

Also in the present embodiment, in the same manner as the first embodiment, the sleep time of the receiver 221 is reduced to be shorter than the sleep time of the transmitter 222 by the period of α or β in the ONU 2 when performing the Cyclic Sleep mode. In the present embodiment, the time-synchronization control unit 211 automatically controls the length of the period α or β by using the time stamp of the time management counter 219.

Figure 12:
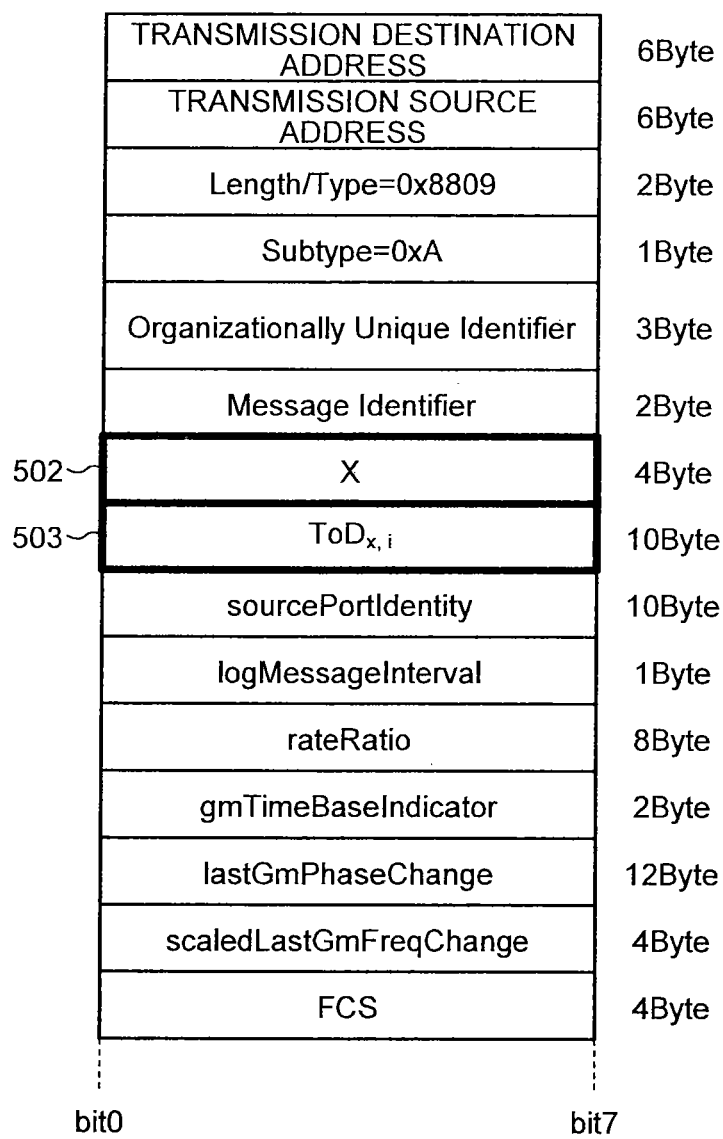
FIG. 12 depicts a format of a TIMESYNC message.

FIG. 12 depicts a format of the TIMESYNC message that is a message for performing the time synchronization defined by the IEEE802.1AS. In the TIMESYNC message, X that is the time stamp (the counter value) is stored in a field 502, and $ToD_{x,j}$ that is time information (seconds, nanoseconds) corresponding to the time stamp is stored in a field 503. The TIMESYNC message is transmitted by being encapsulated in an Ethernet® frame. The OLT 1 transmits the TIMESYNC message to the ONU 2 by storing its time stamp in the field 502 and a time corresponding to the time stamp in the field 503.

At the time of the normal operation, the time management counter 219 is operated based on the clock supplied from the CDR 203. During a period for which no clock is supplied from the CDR 203 (for example, a stop period of the receiver 221), the time management counter 219 is operated based on the clock supplied from the oscillator 207.

Figure 13:
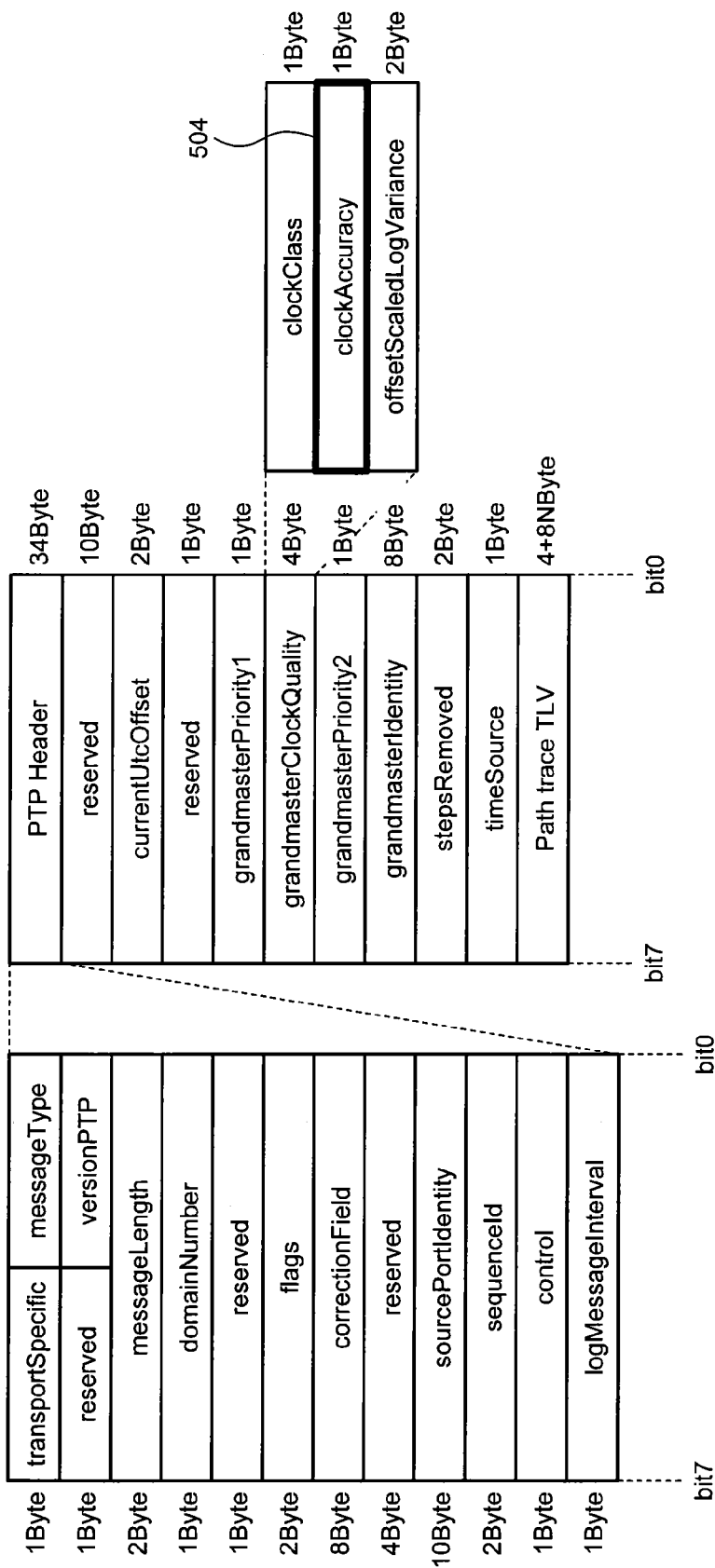
FIG. 13 depicts a format of an Announce message.

FIG. 13 depicts a format of an Announce message defined by the IEEE802.1AS. In the Announce message, a message type of FIG. 13 is set to a value "0xB". The Announce message is transmitted by being encapsulated in an Ethernet® frame. A clockAccuracy is stored in a field 504 of the Announce message. The clockAccuracy is information indicating a property of the time information transmitted in the TIMESYNC message.

After the Discovery Handshake between the OLT 1 and the ONU 2, the TIMESYNC message and the Announce message are transmitted from the OLT 1 to the ONU 2. The power-saving mode setting and the like after the Discovery Handshake are identical to those of the first embodiment. The time-synchronization control unit 211 of the ONU 2 regenerates the time of the OLT 1 based on the time stamp (X) and the time information ($ToD_{x,j}$) in units of seconds, nanoseconds of the TIMESYNC message received from the OLT 1, and sets the regenerated time to the time management counter 219, thus synchronizing the time managed by the time management counter 219 with the time of the OLT 1. A method of calculating the time in the ONU 2 based on the time stamp (X) and the time information ($ToD_{x,j}$) in units of seconds, nanoseconds of the TIMESYNC message is the same as that defined by the IEEE802.1AS. The time management counter 219 generates a pulse for every seconds based on the set time, and transmits serial data represented by an ASCII code that is referred to as "ToD" to a home network-side device via the PHY 206. The time-synchronization control unit 211 extracts the clockAccuracy from the Announce message received from the OLT 1.

A requested time accuracy from a time source inside the station facility 6 (the time accuracy of the OLT 1) to the home network is defined as a system-requested time accuracy in the system. For example, when a connecting device on the side of the home network is a base terminal station, it is requested that the requested time accuracy be ±1 to ±2.5 microseconds based on a wireless communication system (see, for example, "'Emerging Applications Requiring Precision Time and Frequency', M. Bloch, D. Leonard, O. Mancini, T. McClelland, Frequency Control Symposium, 2009 Joint with the 22nd European Frequency and Time forum. IEEE International").

FIG. 14 depicts values and meanings of the clockAccuracy stored in the Announce message. Values (hex) on the left field indicate the values of the clockAccuracy, and a field of Specification next to the Value (hex) indicates meanings corresponding to the values of the clockAccuracy. The Value (hex) and the Specification indicate contents defined by the IEEE1588-2008. A synchronization state on the right field indicates a definition of the synchronization state according to the present embodiment. In the present embodiment, the synchronization state is classified into a high-accuracy time synchronization enabled area (100 nanoseconds or shorter), a mid-accuracy time synchronization enabled area (1 microsecond or shorter), and a low-accuracy time synchronization enabled area (1 microsecond or longer) based on the value of the clockAccuracy. This classification depends on mounting and design, so that the embodiment of the device is not limited to this classification.

For example, in the high-accuracy time synchronization enabled area and the mid-accuracy time synchronization enabled area shown in FIG. 14, the control of the sleep time described in the first embodiment and the present embodiment can likely meet the system time synchronization accuracy; however, in the low-accuracy time synchronization enabled area, even the control of the sleep time can unlikely meet the system time synchronization accuracy. For example, if the system time synchronization accuracy is 1 microsecond, in the case of the low-accuracy time synchronization enabled area shown in FIG. 14, it is considered that the control of the sleep time cannot meet the system time synchronization accuracy. Therefore, in such a case, it is practical to give a priority to the reduction of the power consumption by the normal Cyclic Sleep mode (SYNC) without giving any priority to the time synchronization control (without performing any control for reducing the sleep time of the receiver 221).

In this manner, in the present embodiment, the system-requested time accuracy and the accuracy of the time source (clockAccuracy notified by the Announce message) are compared with each other. From a result of the comparison, when the accuracy of the time source cannot meet the system-requested time accuracy, the normal Cyclic Sleep mode (SYNC) that does not use $\alpha$ and $\beta$ is performed, and when the accuracy of the time source meets the system-requested time accuracy, the Cyclic Sleep mode (ASYNC) is performed, thus achieving an efficient power saving according to the time accuracies of the system request and the time source.

Figure 15:
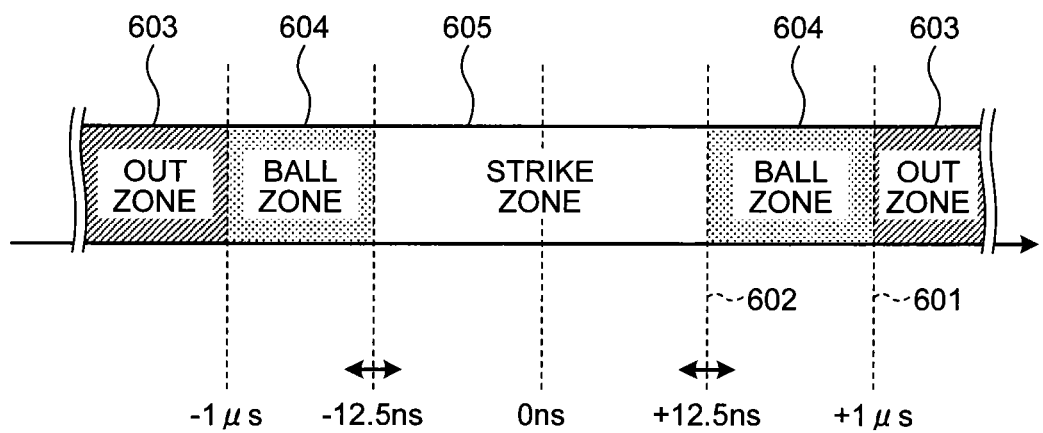
FIG. 15 is an example of a determination reference used in deciding $\beta$ according to a second embodiment.

FIG. 15 is an example of a determination reference used in deciding $\beta$ according to the present embodiment. The horizontal axis represents a difference between the time managed by the time management counter 219 and the time regenerated based on the time information stored in the TIMESYNC message. A boundary line 601 indicates the time accuracy requested by the system (system-requested time accuracy). An outer side of the boundary line 601 is an out zone 603. Although the system-requested time accuracy is set to the synchronization accuracy of ±1 microsecond that is required in the base terminal station as an example, the system-requested time accuracy is not limited thereto. A boundary line 602 indicates, in the same manner as the boundary line 402 of the first embodiment, a boundary between a strike zone 605 and a ball zone 604. A position of the boundary line 602 is variable; however, because it is difficult to achieve the time accuracy higher than the clockAccuracy, a value larger than the value of the clockAccuracy is set in the present embodiment. The reason is because, no matter how much the ONU 2 increases the synchronization accuracy with the OLT 1, the time accuracy of the ONU 2 cannot be increased higher than the accuracy of the time information transmitted from the OLT 1. FIG. 15 is an example in which the value of the clockAccuracy is (=within 25 nanoseconds), and the boundary line 602 is set at ±12.5 nanoseconds.

FIG. 16 is an example of a procedure for deciding $\beta$ according to the present embodiment. In this example, the ONU 2 has the time synchronization function defined by the IEEE802.1AS, and the time-synchronization control unit 211 performs a time synchronizing process. Although the example of using the time synchronization function defined by the IEEE802.1AS is described in this example, the time synchronization function is not limited thereto, but other time synchronization functions can be used to perform the same operations.

Specifically, for example, as shown in FIG. 16, when the Cyclic Sleep mode is started in the ONU 2 (Step S21), the time-synchronization control unit 211 determines whether the TIMESYNC message is received from the OLT 1 (Step S22). At the time of starting the Cyclic Sleep mode, it is assumed that $\alpha$ is set to a predetermined positive value other than zero. When it is determined that the TIMESYNC message is received (YES at Step S22), the time-synchronization control unit 211 extracts the time stamp and the time information from the received frame, and regenerates the time in the ONU 2 based on the extracted time stamp and time information. At this time, the time-synchronization control unit 211 stores therein a difference between the regenerated time and the time indicated by the time management counter 219 before setting the regenerated time (Step S23).

Subsequently, the time-synchronization control unit 211 extracts the clockAccuracy from the Announce message received last, and determines whether the system-requested time accuracy is lower than the extracted clockAccuracy (Step S24). When it is determined that the extracted clockAccuracy is higher than the system-requested time accuracy (that is, the system-requested time accuracy cannot be met) (NO at Step S24), the time-synchronization control unit 211 sets the initial receiver-time synchronization time $\alpha=0$ (Step S29). The meaning of setting the initial receiver-time synchronization time $\alpha=0$ is that the device is operated in the normal Cyclic Sleep mode (SYNC). The power-saving control unit 212 then determines whether the Cyclic Sleep mode is canceled (Step S30), when it is determined that the Cyclic Sleep mode is canceled (YES at Step S30), terminates the process, and when it is determined that the Cyclic Sleep mode is not canceled (NO at Step S30), returns to Step S22.

On the other hand, when it is determined that the system-requested time accuracy is lower than the extracted clockAccuracy (YES at Step S24), the time-synchronization control unit 211 determines whether the difference between the time indicated by the time management counter 219 and the regenerated time obtained at Step S23 falls within any one of the strike zone, the ball zone, and the out zone shown in FIG. 15 (Step S25). When it is determined that the difference is within the strike zone (within the strike zone at Step S25), the time-synchronization control unit 211 decreases the receiver-time synchronization time $\beta$ to be shorter than the initial receiver-time synchronization time $\alpha$ (when performing a repeated operation at Step S30 that is described later, $\beta$ that is already set) or does not change the receiver-time synchronization time $\beta$ (Step S26), and proceed to Step S30.

When it is determined that the difference is within the ball zone Step S25 (within the ball zone at Step S25), the time-synchronization control unit 211 increases the receiver-time synchronization time $\beta$ to be longer than the initial receiver-time synchronization time $\alpha$ (when performing a repeated operation at Step S30, $\beta$ that is already set) (Step S27), and proceed to Step S30. When it is determined that the difference is in the out zone (the out zone at Step S25), the time-synchronization control unit 211 increases the initial receiver-time synchronization time (an initial value of the receiver-time synchronization time) $\alpha$ and the receiver-time synchronization time $\beta$ (Step S28), and proceeds to Step S30.

In this manner, in the present embodiment, it is determined whether the system-requested time accuracy is lower than the clockAccuracy extracted from the Announce message at Step S24, and based on a result of the determination, it is switched between an operation in the Cyclic Sleep mode (SYNC) (proceeding to Step S29) and an operation in the Cyclic Sleep mode (ASYNC) (proceeding to Step S25). Transition can be made in this manner between the Cyclic Sleep mode (SYNC) and the Cyclic Sleep mode (ASYNC) in response to the system-requested time accuracy. Operations of the present embodiment other than those explained above are identical to operations of the first embodiment.

In the present embodiment, the receiver-time synchronization time is decided for the purpose of meeting the system-requested time accuracy, without directly considering the boundary corresponding to the time stamp drift that generates the Deregister. Therefore, in order to avoid the generation of the Deregister, setting may be made not to perform the Deregister at the time of detecting the first time stamp drift after the sleep time, not to perform the Deregister even when the time stamp drift is detected until a predetermined number of times after the sleep time, or the like.

Although the clockAccuracy extracted from the Announce message is used as the accuracy of the time source in the present embodiment, the present invention is not limited thereto, but the ONU 2 may acquire the time accuracy of the time source by other method and use the acquired time accuracy instead of the clockAccuracy.

In the present embodiment, the time-synchronization control unit 211 has a function as a sleep-time control unit that performs a sleep time control for deciding the receiver-time synchronization time β and the initial value α of the receiver-time synchronization time; however, the sleep-time control unit can be provided separately from the time-synchronization control unit 211, so that a normal time synchronizing process is performed by the time-synchronization control unit 211 and the sleep time control mentioned above is performed by the sleep-time control unit.

As described above, in the present embodiment, it is determined whether to perform the Cyclic Sleep mode (SYNC) or the Cyclic Sleep mode (ASYNC), based on the system-requested time accuracy and the time accuracy of the time source, and when performing the Cyclic Sleep mode (ASYNC), the sleep time of the receiver 221 is reduced by a predetermined time (α or β) in the same manner as the first embodiment and the predetermined time is decided to meet the system-requested time accuracy based on a difference between the time managed by the ONU 2 and the time regenerated from the TIMESYNC message. Therefore, the reduction of the power consumption can be achieved while maintaining the system-requested time accuracy.

In the first and second embodiments, while determining differences between time stamp values, an out zone, a ball zone, and a strike zone are used to explain the determinations, for example, the out zone, the ball zone, and the strike zone can be also referred to as "first area", "second area", and "third area", respectively.

REFERENCE SIGNS LIST

1 OLT
2 ONU
3 optical fiber
4 closure
5 core network
6 station facility
7 subscriber's house
8 base terminal station
9 mobile terminal
10 GPS satellite
11 GPS antenna
12 GPS receiver
201 control device
202 optical transmission-and-reception module
203 CDR
204 EPON unit
205 bridge
206 PHY
207 oscillator
208 MPCP control unit
209 time stamp counter
210 CPU unit
211 time-synchronization control unit
212 power-saving control unit
221 receiver
222 transmitter
223 reception unit
224 transmission unit
301, 302, 303 curve
401, 402, 601, 602 boundary line
403, 603 out zone
404, 604 ball zone
405, 605 strike zone
501 Timestamp field
502, 503, 504 field

The invention claimed is:

1. A subscriber-side optical communication device that includes an optical transmission-and-reception module for performing transmission and reception of a signal with a station-side optical communication device and is configured to cause a receiver and a transmitter constituting the optical transmission-and-reception module to enter into a power-saving state separately, the subscriber-side optical communication device comprising:
   a clock regeneration unit that regenerates a clock based on a signal from the station-side optical communication device received by the optical transmission-and-reception module and supplies the clock;
   an internal clock source that generates an internal clock and supplies the internal clock;
   a time management unit that manages a time of the subscriber-side optical communication device based on the clock in a period in which the clock regeneration unit supplies the clock and manages the time of the subscriber-side optical communication device based on the internal clock in a period in which the clock regeneration unit does not supply the clock;
   a sleep-time control unit that decides, when a power-saving mode for causing the receiver to enter into a power-saving state for a predetermined sleep time is set, a receiver-time synchronization time that is a period in which the receiver is normally operated within the sleep time, based on a difference between predetermined information indicating a time in the station-side optical communication device included in the signal transmitted from the station-side optical communication device and the time managed by the time management unit; and
   a power-saving control unit that controls the receiver to be normally operated in the receiver-time synchronization time during the sleep time.

2. The subscriber-side optical communication device according to claim 1, wherein
   the time management unit includes a time stamp counter that manages a time stamp of the subscriber-side optical communication device,
   the predetermined information includes a time stamp stored in an MPCP message, and
   the sleep-time control unit decides the receiver-time synchronization time based on a difference between a time stamp value extracted from the MPCP message received from the station-side optical communication device and the time stamp managed by the time stamp counter.

3. The subscriber-side optical communication device according to claim 1, wherein
   the time management unit includes a time management counter that manages a time of the subscriber-side optical communication device,
   the predetermined information includes a time stamp and time information stored in a TIMESYNC message, and
   the sleep-time control unit decides the receiver-time synchronization time based on a difference between a time regenerated based on the time stamp and the time information extracted from the TIMESYNC message received from the station-side optical communication device and the time managed by the time management counter.

4. The subscriber-side optical communication device according to claim 1, wherein the sleep-time control unit increases the receiver-time synchronization time when an absolute value of the difference is larger than a predetermined threshold value and reduces or does not change the receiver-time synchronization time when the absolute value of the difference is equal to or smaller than the predetermined threshold value.

5. The subscriber-side optical communication device according to claim 1, wherein the predetermined threshold value is decided based on a time accuracy in the station-side optical communication device notified from the station-side optical communication device.

6. The subscriber-side optical communication device according to claim 1, wherein the predetermined threshold value is set to a value equal to or smaller than a time stamp difference with the station-side optical communication device, which is a determination reference for performing a Deregister with the station-side optical communication device.

7. The subscriber-side optical communication device according to claim 1, wherein the power-saving mode includes a mode for causing the transmitter and the receiver to enter into the power-saving state simultaneously and cyclically.

8. A communication system comprising:
a station-side optical communication device; and
the subscriber-side optical communication device according to claim 1, the subscriber-side optical communication device performing transmission and reception of an optical signal with the station-side optical communication device.

9. A communication system comprising:
a station-side optical communication device; and
a subscriber-side optical communication device that performs transmission and reception of an optical signal with the station-side optical communication device, wherein
the subscriber-side optical communication device include
an optical transmission-and-reception module including a receiver and a transmitter that are configured to enter into a power-saving state separately, the optical transmission-and-reception module performing transmission and reception of a signal with the station-side optical communication device,
a clock regeneration unit that regenerates a clock based on a signal from the station-side optical communication device received by the optical transmission-and-reception module and supplies the clock,
an internal clock source that generates an internal clock and supplies the internal clock,
a time management unit that manages a time of the subscriber-side optical communication device based on the clock in a period in which the clock regeneration unit supplies the clock and manages the time of the subscriber-side optical communication device based on the internal clock in a period in which the clock regeneration unit does not supply the clock, and
a sleep-time control unit that decides, when a power-saving mode for causing the receiver to enter into a power-saving state for a predetermined sleep time is set, a receiver-time synchronization time that is a period in which the receiver is normally operated within the sleep time, based on a difference between predetermined information indicating a time in the station-side optical communication device included in the signal transmitted from the station-side optical communication device and the time managed by the time management unit, and notifies the receiver-time synchronization time to the station-side optical communication device, wherein
the station-side optical communication device instructs a new sleep time for the receiver, which is reduced by the notified receiver-time synchronization time, to the subscriber-side optical communication device.

10. A control device for a subscriber-side optical communication device including an optical transmission-and-reception module that performs transmission and reception of a signal with a station-side optical communication device and a clock regeneration unit that regenerates a clock based on a signal from the station-side optical communication device received by the optical transmission-and-reception module and supplies the clock, the subscriber-side optical communication device configured to cause a receiver and a transmitter constituting the optical transmission-and-reception module to enter into a power-saving state separately, the control device comprising:
an internal clock source that generates an internal clock and supplies the internal clock;
a time management unit that manages a time of the subscriber-side optical communication device based on the clock in a period in which the clock regeneration unit supplies the clock and manages the time of the subscriber-side optical communication device based on the internal clock in a period in which the clock regeneration unit does not supply the clock;
a sleep-time control unit that decides, when a power-saving mode for causing the receiver to enter into a power-saving state for a predetermined sleep time is set, a receiver-time synchronization time that is a period in which the receiver is normally operated within the sleep time, based on a difference between predetermined information indicating a time in the station-side optical communication device included in the signal transmitted from the station-side optical communication device and the time managed by the time management unit; and
a power-saving control unit that controls the receiver to be normally operated in the receiver-time synchronization time during the sleep time.

11. A power-saving control method for a subscriber-side optical communication device including an optical transmission-and-reception module that performs transmission and reception of a signal with a station-side optical communication device, the subscriber-side optical communication device configured to cause a receiver and a transmitter constituting the optical transmission-and-reception module to enter into a power-saving state separately, the power-saving control method comprising:
a clock regeneration step of regenerating a clock based on a signal from the station-side optical communication device received by the optical transmission-and-reception module and supplying the clock;
an internal-clock generation step of generating an internal clock and supplying the internal clock;
a time management step of managing a time of the subscriber-side optical communication device based on the clock in a period in which the clock is supplied at the clock regeneration step and manages the time of the subscriber-side optical communication device based on the internal clock in a period in which the clock is not supplied at the clock regeneration step;
a sleep-time control step of deciding, when a power-saving mode for causing the receiver to enter into a power-saving state for a predetermined sleep time is set, a receiver-time synchronization time that is a period in which the receiver is normally operated within the sleep time, based on a difference between predetermined information indicating a time in the station-side optical communication device included in the signal transmitted from the station-side optical communication device and the time managed at the time management step; and
a power-saving control step of controlling the receiver to be normally operated in the receiver-time synchronization time during the sleep time.

\* \* \* \* \*